US012623486B2

(12) United States Patent
Suzuki et al.

(10) Patent No.: US 12,623,486 B2
(45) Date of Patent: May 12, 2026

(54) MECANUM WHEEL

(71) Applicant: Nabtesco Corporation, Tokyo (JP)

(72) Inventors: Kazuyoshi Suzuki, Tokyo (JP); Takuya Shinkai, Tokyo (JP); Kenya Tomiyasu, Tokyo (JP); See Wah Ma, Tokyo (JP); Ikuto Gonja, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 468 days.

(21) Appl. No.: 18/184,876

(22) Filed: Mar. 16, 2023

(65) Prior Publication Data

US 2023/0339261 A1     Oct. 26, 2023

(30) Foreign Application Priority Data

Apr. 20, 2022     (JP) ................................. 2022-069635

(51) Int. Cl.
B60B 19/00       (2006.01)
B60B 19/12       (2006.01)

(52) U.S. Cl.
CPC ............ B60B 19/003 (2013.01); B60B 19/12 (2013.01)

(58) Field of Classification Search
CPC .............................. B60B 19/003; B60B 19/12
See application file for complete search history.

(56) References Cited

U.S. PATENT DOCUMENTS

| | | | | |
|---|---|---|---|---|
| 4,822,183 A | * | 4/1989 | Lederman | ............... F16C 19/10 |
| | | | | 384/477 |
| 6,340,065 B1 | * | 1/2002 | Harris | ................... B60B 19/003 |
| | | | | 301/5.23 |
| 7,641,288 B1 | * | 1/2010 | Baker | ................... B60B 19/125 |
| | | | | 16/45 |
| 8,011,735 B2 | * | 9/2011 | Scogna | ................. B60B 19/003 |
| | | | | 301/5.23 |

(Continued)

FOREIGN PATENT DOCUMENTS

| | | |
|---|---|---|
| DE | 102019211937 A1 | 2/2020 |
| JP | 2009-504465 A | 2/2009 |
| JP | 2019-137390 A | 8/2019 |

(Continued)

OTHER PUBLICATIONS

Extended European Search Report dated Jun. 29, 2023, issued in corresponding European Patent Application No. 23162043.6 (11 pgs.).

*Primary Examiner* — Jason R Bellinger
(74) *Attorney, Agent, or Firm* — Pillsbury Winthrop Shaw Pittman, LLP

(57)                ABSTRACT
A wheel of the present disclosure includes a barrel holder, barrel support shafts, barrels, and bearings. The barrel holder is rotationally driven. The barrel support shafts arranged on the circumference of the barrel holder at an angle to a rotation axis of the barrel holder. The barrels are barrel-shaped rotating bodies. The barrels are rotatably supported on the corresponding barrel support shafts, and outer surfaces of the barrels contact a surface on which the wheel (Continued)

travels as the barrel holder rotates. The bearing supports the retainer. A groove is formed at least in a region of the outer circumferential surface of the barrel support shaft extending in the axial direction and including a radially inner projected area of the retainer.

9 Claims, 5 Drawing Sheets

(56)                     References Cited

U.S. PATENT DOCUMENTS

| | | | |
|---|---|---|---|
| 8,496,299 B2 * | 7/2013 | Brudniok | .............. B60B 19/003 |
| | | | 16/45 |
| 2009/0065113 A1 | 3/2009 | Gunther | |

FOREIGN PATENT DOCUMENTS

| | | | |
|---|---|---|---|
| JP | 2021-146849 A | 9/2021 | |
| JP | 2021-146850 A | 9/2021 | |

\* cited by examiner

MECANUM WHEEL

CROSS-REFERENCE TO RELATED APPLICATIONS

This application is based on and claims the benefit of priority from Japanese Patent Application Serial No. 2022-069635 (filed on Apr. 20, 2022), the contents of which are hereby incorporated by reference in their entirety.

TECHNICAL FIELD

The present disclosure relates to a wheel used for a transfer device, a drive unit, and a transfer device.

BACKGROUND

Mecanum wheels are known as wheels used for a transfer device. This wheel includes a plurality of barrels and a barrel holder. The barrels are barrel-shaped rotating bodies. The barrel holder supports the plurality of barrels rotatably on the circumference of the barrel holder. The barrel holder is rotationally driven by a drive device such as a motor (see, for example, Japanese Translation of PCT International Patent Application 2009-504465).

The plurality of barrels are held on the circumference of the barrel holder at an angle to the holder rotation axis of the barrel holder. Such wheels are disposed at around the four corners of the transfer device. Each wheel located at the four corners of the transfer device is independently controlled by the drive device. That is, the transfer device can move freely in various directions by controlling the direction of rotation and torque of each wheel individually. The wheels on the left side and the wheels on the right side of the transfer device are set differently such that their barrels have the opposite inclination held on the circumference of the barrel holder.

A pair of support flanges are provided at two axially outer ends of the barrel holder and extend outward in the radial direction of the barrel holder. A plurality of barrel support shafts extend between the pair of support flanges and are fixed thereon. The barrels are rotatably supported by the corresponding barrel support shaft and barrel holder via radial and thrust bearings.

The thrust bearing is disposed in a bearing receiving portion between a circular recess formed at the axial end of the barrel and the outer surface of the barrel support shaft. The thrust bearing includes a first race, a second race, and a plurality of rolling elements. The first race contacts a member disposed on the bottom side of the bearing receiving portion in the bearing receiving portion. The second race contacts a member disposed on the support flange side of the barrel holder. The plurality of rolling elements rotatably contact with the first race and the second race. The plurality of rolling elements are rotatably supported by a retainer. The rolling elements and the retainer are disposed between the first and second races.

In the above conventional wheel (mecanum wheel), once the barrel holder is rotationally driven by a drive device such as a motor, the outer surfaces of the barrels sequentially contact a traveling surface on which the wheel travels. The transfer device is propelled by receiving reaction force from the traveling surface. At this time, the contact position of each barrel where it contacts the ground surface moves continuously between one end and the other of the barrel in the axial direction as the barrel holder rotates. Thus, when the transfer device travels, a large thrust load is applied alternately to the thrust bearing disposed at axially one end of the barrel and the thrust bearing disposed at the other end of the barrel. When a large thrust load is applied to one thrust bearing, the thrust load on the other thrust bearing is reduced. This may displace the first and second races in a direction away from the plurality of rolling elements. If the separation of the first and second races from the rolling elements becomes large, the retainer may be displaced in the radial direction together with the rolling elements. In this case, there is a possibility that the retainer may interfere with surrounding components such as the barrel support shaft.

To address this, for example, the clearance between the thrust bearing and a member (e.g., the member on the barrel holder side) that contacts the first and second races in the axial direction may be strictly controlled. However, this approach increases the manufacturing cost of the components and requires the manufacturer to perform complicated work to control the clearance.

SUMMARY

The present disclosure provides a wheel in which interference between a bearing retainer and surrounding members can be prevented without requiring strict clearance control between the members. The disclosure also provides a drive unit and transfer device thereof.

(1) A wheel according to one aspect of the disclosure includes: a barrel holder rotationally driven; a plurality of barrel support shafts arranged on a circumference of the barrel holder at an angle to a rotation axis of the barrel holder; barrels rotatably supported on the corresponding barrel support shafts, each of the barrels being a barrel-shaped rotating body, outer surfaces of the barrels sequentially contacting a surface on which the wheel travels as the barrel holder rotates; and bearings disposed between the respective barrel support shafts and the respective barrels, each of the bearings rotatably supporting the corresponding barrel and having a retainer. The bearing is disposed at an axially outer end of the barrel and encloses the barrel support shaft. A groove is provided at least in a region of an outer circumferential surface of the barrel support shaft. The region extends in an axial direction and includes a radially inner projected area of the retainer.

(2) The bearing may include: a first race abutting a first member in the axial direction, the first member being disposed closer to the barrel than the bearing; a second race abutting a second member in the axial direction, the second member being disposed closer to the barrel holder than the bearing; and a plurality of rolling elements disposed between the first race and the second race, the plurality of rolling elements rollably contacting the first race and the second race. The retainer is disposed between the first race and the second race and supports the plurality of rolling elements. The groove is provided in the outer circumferential surface of the barrel support shaft, the groove extends in the axial direction and crosses over an end portion of an inner end surface of the first race and an end portion of an inner end surface of the second race. The inner end surface of the first race and the inner end surface of the second race oppose to each other.

(3) The groove is provided in the outer circumferential surface of the barrel support shaft such that the groove does not cross over an end portion of an outer end surface of the first race and an end portion of an outer end surface of the second race. The outer end surface of the first race and the outer end surface of the second race face away from the rolling elements.

(4) A recess dented inwardly in the axial direction may be provided in an axial end portion of the barrel. The bearing is housed in a bearing housing portion defined by the recess and an outer surface of the barrel support shaft. A groove is provided at least in a region of an inner circumferential surface of the recess. The region extends in the axial direction and includes a radially outer projected area of the retainer.

(5) A wheel according to another aspect of the disclosure includes: a barrel holder rotationally driven; a plurality of barrel support shafts arranged on a circumference of the barrel holder at an angle to a rotation axis of the barrel holder; barrels rotatably supported on the corresponding barrel support shafts, each of the barrels being a barrel-shaped rotating body, outer surfaces of the barrels sequentially contacting a surface on which the wheel travels as the barrel holder rotates; and bearings disposed between the respective barrel support shafts and the respective barrels, each of the bearings rotatably supporting the corresponding barrel and having a retainer. The bearing is disposed at an axially outer end of the barrel and encloses the barrel support shaft. A recess dented inwardly in the axial direction is provided in an axial end portion of the barrel. The bearing is housed in a bearing housing portion defined by the recess and an outer surface of the barrel support shaft. A groove is provided at least in a region of an inner circumferential surface of the recess. The region extends in the axial direction and includes a radially outer projected area of the retainer.

(6) The bearing may include: a first race abutting a first member in the axial direction, the first member being disposed closer to the barrel than the bearing; a second race abutting a second member in the axial direction, the second member being disposed closer to the barrel holder than the bearing; and a plurality of rolling elements disposed between the first race and the second race, the plurality of rolling elements rollably contacting the first race and the second race. The retainer is disposed between the first race and the second race and supports the plurality of rolling elements. A a spacer block is disposed between an outer surface of the second race facing away from the rolling elements and the barrel holder, the spacer block being attached on the outer circumferential surface of the barrel support shaft. An elastic member is disposed between the spacer block and the second race, the elastic member contacts the spacer block, the outer end surface of the second race, and the outer circumferential surface of the barrel support shaft.

(7) A drive unit according to one aspect of the disclosure includes: a wheel; and a drive device rotationally driving the wheel. wherein the wheel includes: a barrel holder rotationally driven; a plurality of barrel support shafts arranged on a circumference of the barrel holder at an angle to a rotation axis of the barrel holder; barrels rotatably supported on the corresponding barrel support shafts, each of the barrels being a barrel-shaped rotating body, outer surfaces of the barrels sequentially contacting a surface on which the wheel travels as the barrel holder rotates; and bearings disposed between the respective barrel support shafts and the respective barrels, each of the bearings rotatably supporting the corresponding barrel and having a retainer. The bearing is disposed near an axially outer end of the barrel and encloses the barrel support shaft. A groove is provided at least in a region of an outer circumferential surface of the barrel support shaft. The region extends in an axial direction and includes a radially inner projected area of the retainer.

(8) A transfer device according to one aspect of the disclosure includes: a wheel, a drive device rotationally driving the wheel; and a vehicle body supporting the wheel and the drive device. The wheel includes: a barrel holder rotationally driven; a plurality of barrel support shafts arranged on a circumference of the barrel holder at an angle to a rotation axis of the barrel holder; barrels rotatably supported on the corresponding barrel support shafts, each of the barrels being a barrel-shaped rotating body, outer surfaces of the barrels sequentially contacting a surface on which the wheel travels as the barrel holder rotates; and bearings disposed between the respective barrel support shafts and the respective barrels, each of the bearings rotatably supporting the corresponding barrel and having a retainer. The bearing is disposed at an axially outer end of the barrel and encloses the barrel support shaft. A groove is provided at least in a region of an outer circumferential surface of the barrel support shaft. The region extends in an axial direction and includes a radially inner projected area of the retainer.

In the wheel according to one aspect of the disclosure, the groove is provided in the region of the outer circumferential surface of the barrel support shaft. The region extends in the axial direction and includes the radially inner projected area of the retainer. With this configuration, when the direction of the thrust load applied to the bearing changes alternately as the wheel rotates, the bearing retainer is radially displaced, which prevents interference with the outer surface of the barrel support shaft. Therefore, by employing the wheel according to one aspect of the disclosure, interference between the bearing retainer and the surrounding members can be prevented without requiring strict clearance control between the members.

In the wheel according to another aspect of the disclosure, the groove is provided at least in the region of the inner circumferential surface of the recess. The region extends in the axial direction and includes a radially outer projected area of the retainer. With this configuration, when the direction of the thrust load applied to the bearing changes alternately as the wheel rotates, the bearing retainer is radially displaced, which prevents interference with the inner circumferential surface of the recess formed in the barrel. Therefore, by employing the wheel according to another aspect of the disclosure, interference between the bearing retainer and the surrounding members can be prevented without requiring strict clearance control between the members.

DESCRIPTION OF THE EMBODIMENTS

Figure 1:
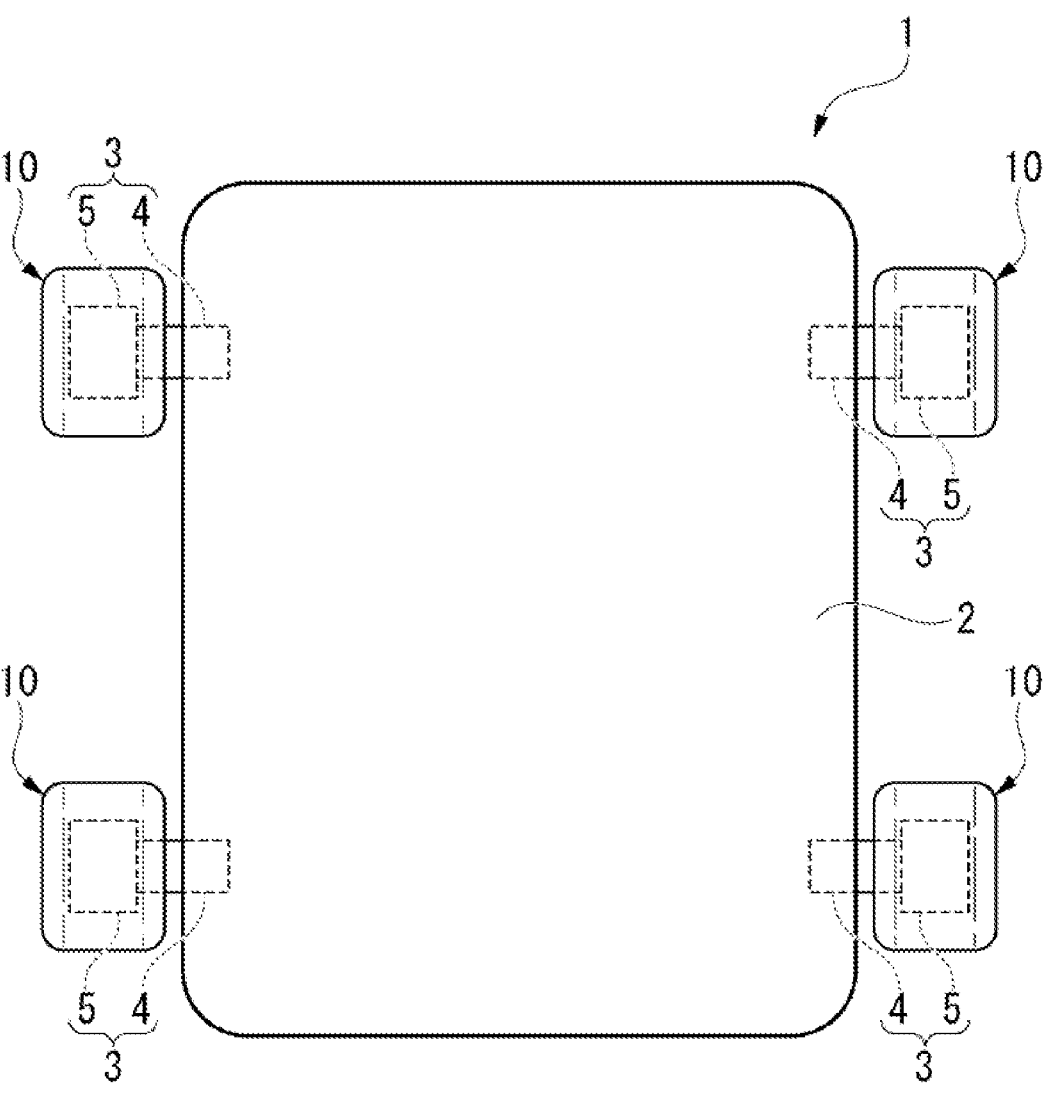
FIG. 1 is a plan view of a transfer device relating to the embodiments.

The embodiments of the present disclosure will be hereinafter described with reference to the drawings. In the following embodiments, like elements may be labeled similarly and redundant descriptions will be omitted. As shown in FIG. 1, a wheel 10 in the embodiments is used for a transfer device 1. FIG. 1 illustrates the transfer device 1 viewed from above. The wheels 10 of each embodiment are disposed on the front left and right sides of a vehicle body 2 of the transfer device 1 and on the rear left and right sides of the vehicle body 2. Each wheel 10 is driven independently by a drive device 3 supported by the vehicle body 2. The drive device 3 includes a motor 4 and a speed reducer 5 that reduces the rotation of the motor 4 and transmits the reduced rotations to the corresponding wheel 10. In this embodiment, a drive unit includes the wheel 10 and the drive device 3 that rotationally rotates the wheel 10. The wheels on the left side and the wheels on the right side of the transfer device 1 are set in opposite direction such that their barrels 13 have the opposite inclination held on the circumference of a barrel holder 11, which will be later described.

First Embodiment

Figure 2:
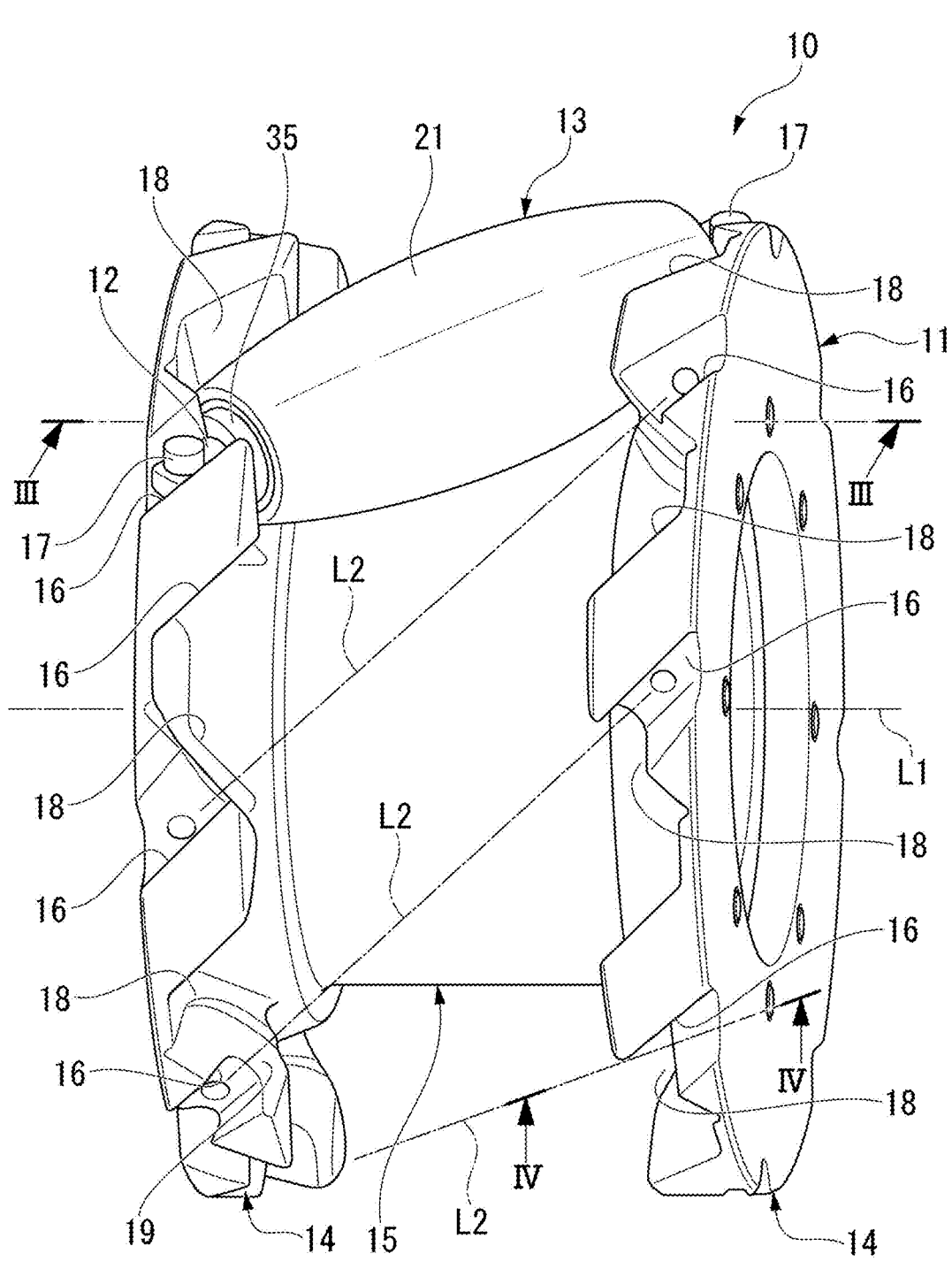
FIG. 2 is a perspective view of a wheel relating to a first embodiment.
Figure 3:
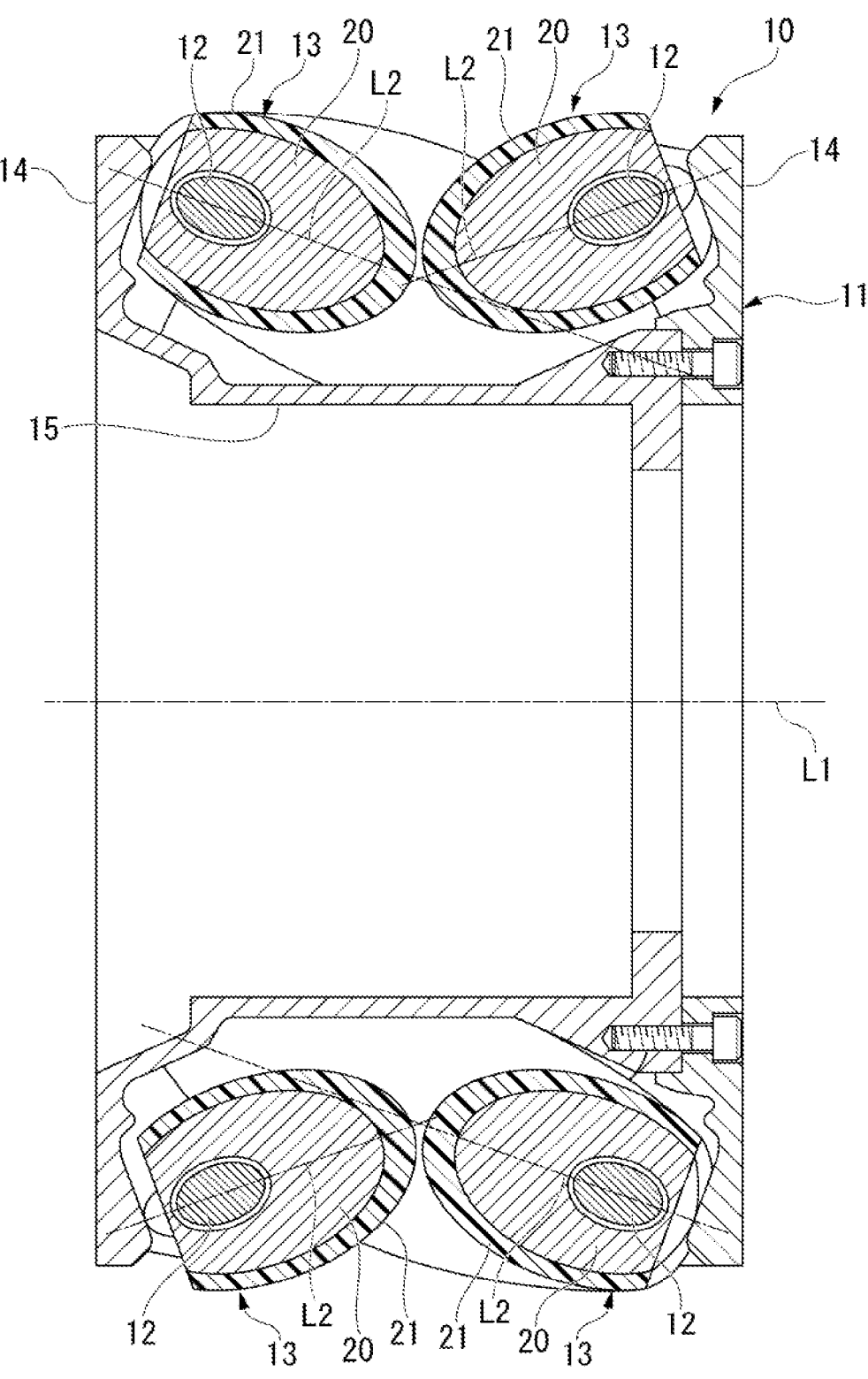
FIG. 3 is a sectional view of the wheel relating the first embodiment along line III-III of FIG. 2.
Figure 4:
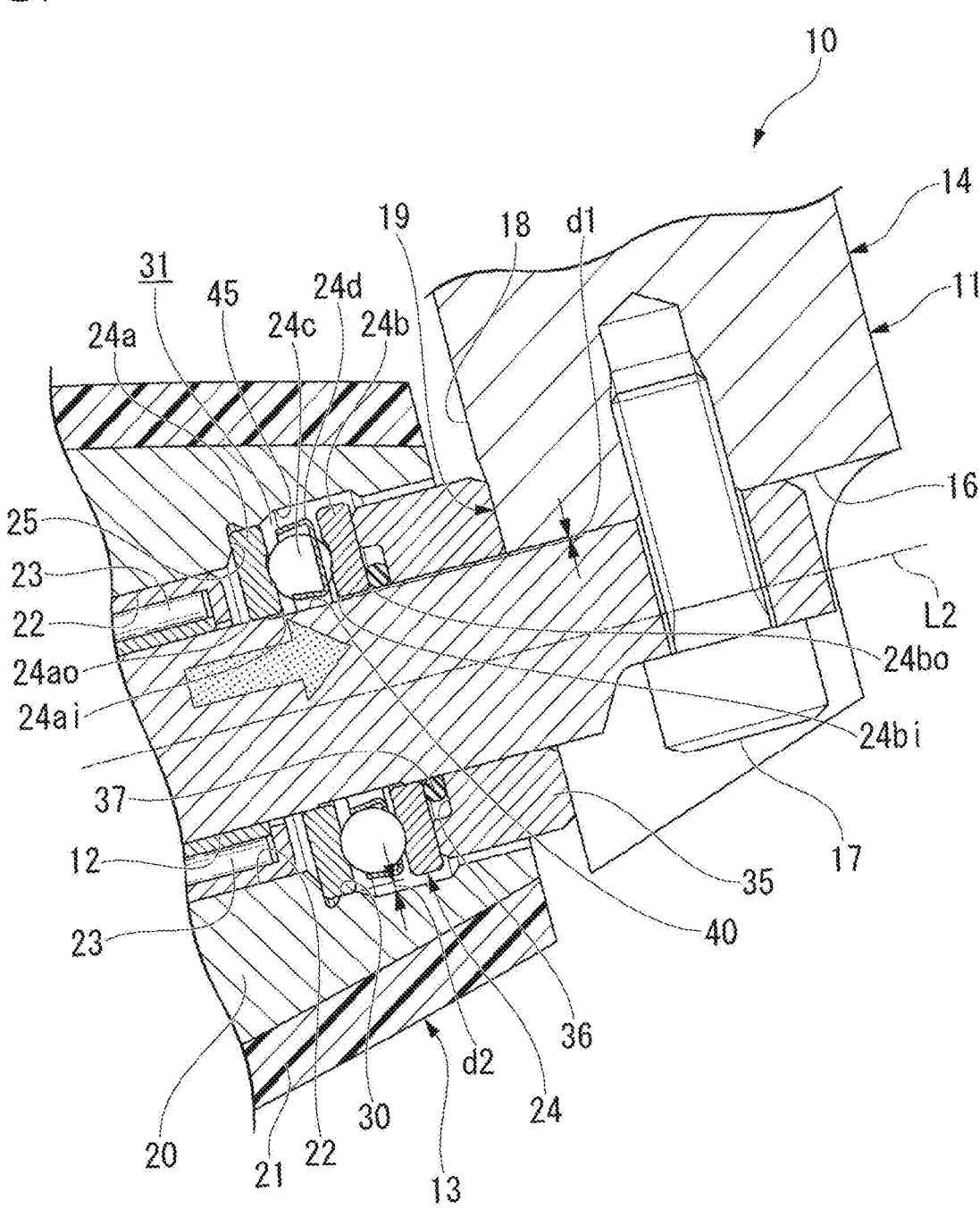
FIG. 4 is a sectional view of the wheel relating the first embodiment along line IV-IV of FIG. 2.

FIG. 2 is a perspective view of the wheel 10 relating to the first embodiment. FIG. 3 is a sectional view along line III-III of FIG. 2. FIG. 4 is a sectional view along line IV-IV of FIG. 2. FIG. 3 schematically illustrates the internal structure of the barrel holder 11 in a simplified form to avoid complex illustration of the internal structure of the barrel 13, which is described later. As shown in FIGS. 2 to 4, the wheel 10 includes the cylindrical barrel holder 11 rotationally driven by the drive device 3 (see FIG. 1), a plurality of barrel support shafts 12 supported on the circumference of the barrel holder 11, and the barrels 13, which are barrel-shaped rotating bodies, supported on the respective barrel support shafts 12. Only one set of the barrel 13 and the barrel mounting parts such as the barrel support shaft 12 is shown in FIG. 2, and the remaining sets including other barrels 13 are omitted. Only the central axis lines L2 of the barrel support shafts 12 for the remaining sets of the barrels 13 are shown in FIG. 2.

The barrel holder 11 includes a pair of support flanges 14 disposed spaced apart in the axial direction (in the width direction of the vehicle body 2) from each other, and a connecting cylinder 15 that connects the pair of support flanges 14. The pair of support flanges 14 are formed in the shape of a disk with a center hole. Accordingly, the pair of support flanges 14 are formed in a substantially cylindrical shape continuous in the circumferential direction. Inside the barrel holder 11, which has a substantially cylindrical shape, the drive device 3 (speed reducer 5 and a part of the motor 4) shown in FIG. 1 is disposed. The output portion of the speed reducer 5 is connected, for example, to the support flange 14. The output portion of the speed reducer 5 reduces the rotation of the motor 4 and transmits the reduced rotation to the barrel holder 11. The axis of rotation of the barrel holder 11 when the barrel holder 11 is rotated by the rotation of the motor 4 is referred to as a holder rotation axis L1.

The outer diameter of the connecting cylinder 15 is smaller than that of the support flange 14. Fixing grooves 16 are formed on the outer periphery of each support flange 14. Both ends of the barrel support shaft 12 in its axial direction, which supports the corresponding barrel 13, are fixed in the fixing groove 16, for example, by a bolt 17. The barrel support shafts 12 are fixed to the pair of support flanges 14 at a predetermined angle to the holder rotation axis L1. Barrel receiving recesses 18 are formed in the side edge of each of the support flanges 14 closer to the connecting cylinder 15. The axial end of the barrel 13 supported by the barrel support shaft 12 is accommodated in the barrel receiving recess 18. Each barrel receiving recess 18 has an opposing wall 19 that faces an axial end surface of the barrel 13. The opposing wall 19 is orthogonal to a central axis L2 of the barrel 13 housed in the barrel receiving recess 18.

The barrel 13 supported by the corresponding barrel support shaft 12 includes a barrel base body 20 made of metal and a skin material 21 made of urethane. The barrel base body 20 has a barrel shape, bulging in the axial center region of the barrel base body 20. The skin material 21 is bonded to the outer periphery of the barrel base body 20 by adhesive or other means. As shown in FIG. 4, a shaft hole 22 extending in the axial direction is formed in the barrel base body 20 at the axial center of the barrel base body. The barrel support shaft 12 is inserted in the shaft hole 22. Between the shaft hole 22 of the barrel base body 20 and the barrel support shaft 12, a radial bearing 23 and thrust bearing 24 are inserted to freely support the barrel 13 on the barrel support shaft 12. The radial bearing 23 and thrust bearing 24 are disposed in the shaft hole 22 and at each end of the shaft hole 22 in the axial direction. In the shaft hole 22, the thrust bearing 24 is situated axially more outward than the radial bearing 23 and adjacent to the radial bearing 23. The thrust bearing 24 encloses the barrel support shaft 12 and is located near the axially outer end of the barrel 13. The thrust bearing 24 receives a thrust loads acting on the barrel 13.

At the axially outer end of the barrel base material 20 is provided with a recess 30 that extends inwardly in the axial direction. The recess 30 is formed continuously with the shaft hole 22 in the barrel base body 20 and has a lager inner diameter than the shaft hole. The axial end of the barrel 13 is opposed to the opposing wall 19 of the barrel holder 11 in the barrel receiving recess 18 of the barrel holder 11. The thrust bearing 24 is disposed in a bearing housing portion 31 defined by the recess 30 formed in the barrel 13 and the outer surface of the barrel support shaft 12.

The thrust bearing 24 includes a first race 24*a*, a second race 24*b*, a plurality of rolling elements 24*c* (e.g., spherical bodies), and a retainer 24*d*. The first race 24*a* and the second race 24*b* are formed in a disk-shape with a center hole. The first race 24*a* and the second race 24*b* are arranged to face each other in the axial direction in the recess 30 formed in the barrel 13. The first race 24*a* is disposed on the bottom wall side in the recess 30. The outer end surface of the first race 24*a* abuts on the axially outward facing end surface 25 (first member) among the walls defining the recess 30. The barrel support shaft 12 is fitted into the respective center holes of the first race 24*a* and the second race 24*b*. The thrust bearing 24 including the first race 24*a* and the second race 24*b* is disposed near the axially outer end of the barrel 13 and surrounds around the barrel support shaft 12.

The plurality of rolling elements 24*c* are arranged annularly between the first race 24*a* and the second race 24*b*. Furthermore, the plurality of rolling elements 24*c* rollably contact an inner end surface of the first race 24*a* and an inner end surface of the second race 24*b*. The inner end surfaces of the first race 24*a* and the second race 24*b* are opposed to each other. The retainer 24*d* is formed in an annular shape and disposed between the first race 24*a* and the second race 24*b*. The retainer 24*d* rotatably holds the plurality of rolling elements 24*c*.

A metallic cylindrical spacer block 35 (second member) is fitted on the outer circumference of the barrel support shaft 12. The spacer block 35 is fitted on the outer circumference of a part of the barrel support shaft 12 situated outside of the thrust bearing 24 (second race 24*b*) in the axial direction. The outer diameter of the spacer block 35 is smaller than the inner diameter of the recess 30 formed in the barrel 13. A part of the spacer block 35 is inserted into the recess 30 from the outside in the axial direction. A first end surface of the spacer block 35 situated on one side in the axial direction abuts against the opposing wall 19 of the barrel holder 11. A second end surface of the spacer block 35 situated on the other side in the axial direction abuts against the outer end surface of the second race 24*b* of the thrust bearing 24 (end surface facing away from the rolling element 24*c*).

An annular recess 36 dents in a stepped manner and away from the second race 24*b* is formed on the inner circumference of the second end surface of the spacer block 35. Therefore, the annular recess 36 opens radially inward and toward the second race 24*b*. The bottom surface of the annular recess 36 is a flat surface perpendicular to the axial direction of the spacer block 35. An annular elastic member 37 is provided in the annular recess 36. The elastic member 37 is, for example, an O-ring made of rubber, elastic resin, or the like. The elastic member 37 is attached on the outer surface of the barrel support shaft 12. The elastic member 37 basically has the outer diameter larger than the axial depth of the annular recess 36. When the barrel 13 and barrel support shaft 12 together with the thrust bearing 24 and spacer block 35 are assembled on the barrel holder 11, the elastic member 37 is disposed between the bottom surface of the annular recess 36 (the surface facing the second race 24*b*) and the outer end surface of the second race 24*b*. At the same time, the elastic member 37 elastically contacts the outer surface of the barrel support shaft 12. The second race 24*b* is pressed toward the first race 24*a* by the elastic force (elastic restoring force) of the elastic member 37.

A groove 40 denting radially inward is formed in a portion of the outer circumferential surface of the barrel support shaft 12 that is exposed inside the bearing housing portion 31. The groove 40 is formed in the outer surface of the barrel support shaft 12 with a predetermined width and a predetermined depth. The groove 40 is formed at least in a region of the outer circumferential surface of the barrel support shaft 12 situated on radially inner side of the retainer 24*d* and is formed along the axial direction. That is, the groove 40 extends in the axial direction and at least in a region of the outer surface of the barrel support shaft 12 that includes a radially inner projected area of the retainer 24*d*. More specifically, the groove 40 extends in the axial direction in the outer circumferential surface of the barrel support shaft 12 beyond an end portion 24*ai* of the inner end surface (surface situated closer to the rolling element 24*c*) of the first race 24*a* toward an end portion 24*ao* of the outer end surface (surface situated away from the rolling element 24*c*) of the first race 24*a*. The groove 40 further extends in the axial direction in the outer circumferential surface of the barrel support shaft 12 beyond an end portion 24*bi* of the inner end surface (surface situated closer to the rolling element 24*c*) of the second race 24*b* toward an end portion 24*bo* of the outer end surface (surface situated away from the rolling elements 24*c*) of the second race 24*b*. Note that the groove 40 is formed such that it does not cross over (extend beyond) the end portion 24*ao* of the first race 24*a* and the end portion 24*bo* of the second race 24*b*. The depth d1 of the groove 40 formed in the barrel support shaft 12 is preferably 0.2 mm≤d1<0.5 mm (that is, d1 is equal to or more than 0.2 mm and less than 0.5 mm).

The outer surface of the axially central region of the barrel support shaft 12 serves as a contact surface with which the radial bearing 23 contacts. The outer surfaces of the axially end regions of the barrel support shaft 12 are accurately fastened to the barrel holder 11 (the fixing grooves 16 of the support flanges 14). The required outer diameter of the outer surface of the central region of the barrel support shaft 12 is different from the required outer surface of the end regions of the barrel support shaft 12. Thus, a step of grinding the outer surface of the central region of the barrel support shaft 12 is performed separately from a step of grinding the outer surface of the end regions of the barrel support shaft 12. The groove 40 formed in the barrel support shaft 12 also serves as a grinding groove for preventing the outer surface of the central region of the barrel support shaft 12 from being ground when the step of grinding the outer surface of the end regions of the barrel support shaft 12 is performed and preventing the outer surface of the end regions of the barrel support shaft 12 from being ground when the step of grinding the outer surface of the central region of the barrel support shaft 12 is performed.

The inner circumferential surface of the recess 30 further has a groove 45 that dents toward the radially outside. The groove 45 is formed in the inner circumferential surface of the recess 30 with a predetermined width and a predetermined depth. The groove 45 is formed at least in a region of the inner circumferential surface of the recess 30 situated radially outer side of the retainer 24*d* and is formed along the axial direction. That is, the groove 45 is provided at least in the region of the inner circumferential surface of the recess 30 that extends in the axial direction and includes a radially outer projected area of the retainer 24*d*. Similarly to the depth d1 of the groove 40, the depth d2 of the groove 45 formed in the inner circumferential surface of the recess 30 is preferably 0.2 mm≤d2<0.5 mm (that is, d2 is equal to or more than 0.2 mm and less than 0.5 mm).

As described above, the wheel 10 of this embodiment has the groove 40 formed at least in the outer surface of the portion of the barrel support shaft 12 situated on radially inner side of the retainer 24*d* of the thrust bearing 24. In particular, the groove 40 is formed along the axial direction in the region of the outer surface of the barrel support shaft 12 including the projected area of the retainer 24*d*. Thus, even if a separation between the first race 24*a* and the second race 24*b* of the thrust bearing 24 increases and this allows the retainer 24*d* of the thrust bearing 24 to be displaced radially inward, interference of the retainer 24*d* with the outer surface of the barrel support shaft 12 can be avoided by the groove 40. Therefore, by employing the wheel 10 of the embodiment, interference between the retainer 24*d* of the thrust bearing 24 and the surrounding members can be prevented without requiring strict gap control between the members. This makes it possible to reduce wear powder and like generated due to the interference of the retainer 24*d* with the surrounding members while simplifying the manufacturing process.

The wheel 10 of the embodiment has the groove 40 that is formed in the outer circumferential surface of the barrel support shaft 12 to extend along the axial direction. The groove 40 extends such that it crosses over the end portions 24*ai* and 24*bi* of the inner opposing end surfaces of the first race 24*a* and the second race 24*b*. Thus, even if the separation between the first race 24*a* and the second race 24*b* of the thrust bearing 24 increases and the retainer 24*d* of the thrust bearing 24 is displaced a little in the axial direction, the interference of the retainer 24*d* with the outer surface of the barrel support shaft 12 can be reliably avoided.

Further, in the wheel 10 of the embodiment, the groove 40 is formed in the outer circumferential surface of the barrel support shaft 12 along the axial direction and the groove 40 does not cross over (extend beyond) the end portions 24*ao* and 24*bo* of the outer end surfaces of the first race 24*a* and the second race 24*b* facing away from the rolling elements 24*c*. Thus, the groove 40 does not interfere with the stable support of the first race 24*a* and the second race 24*b* with respect to the barrel support shaft 12. Therefore, with this configuration, rattling of the thrust bearing 24 can be suppressed and the wheel can move quietly.

Moreover, the wheel 10 of the embodiment has the groove 45 formed in the inner circumferential surface of the portion of the recess 30 situated at least radially outer side of the retainer 24*d* of the thrust bearing 24. In particular, the groove 45 is formed along the axial direction in the region including the projected area of the retainer 24*d*. Thus, even if the separation between the first race 24*a* and the second race 24*b* of the thrust bearing 24 increases and this allows the retainer 24*d* of the thrust bearing 24 to be displaced radially outward, interference of the retainer 24*d* with the inner circumferential surface of the recess 30 can be avoided by the groove 45.

The wheel 10 of the embodiment has the groove 40 formed in the outer circumferential surface of the barrel support shaft 12 and the groove 45 formed in the inner circumferential surface of the recess 30 of the barrel 13. However, the present disclosure is not limited to this case. For example, it is also possible to form a relief groove only in either the outer circumferential surface of the barrel support shaft 12 or the inner circumferential surface of the recess 30. When the relief groove (groove 45) is formed only in the inner circumferential surface of the recess 30, it is also possible to avoid the interference between the retainer 24*d* of the thrust bearing 24 and the inner circumferential surface of the recess 30.

The wheel 10 of the embodiment has the elastic member 37 provided between the spacer block 35 and the second race 24*b* disposed around the barrel support shaft 12. The elastic member 37 contacts the spacer block 35, the end surface of the second race 24*b*, and the outer surface of the barrel support shaft 12. Thus, the elastic restoring force of the elastic member 37 can be utilized to constantly press the second race 24*b* against the first race 24*a*. In this way, it is possible to prevent increase of the separation between the first race 24*a* and the second race 24*b*. As described above, with the above configuration, the displacement of the retainer 24*d* in the radial direction is prevented and thus it is possible to prevent the interference of the retainer 24*d* with the outer surface of the barrel support shaft 12 and the inner circumferential surface of the recess 30.

Furthermore, in this configuration, the elastic member 37 contacts the spacer block 35, the end surface of the second race 24*b*, and the outer surface of the barrel support shaft 12, so that it is possible to suppress rattle or clatter between the second race 24*b* and the spacer block 35 by the elastic member 37. Moreover, it is possible to hold the spacer block 35 around the outer circumference of the barrel support shaft 12 by the elastic member 37 without using a fastening member or the like. With this configuration, it is not necessary to provide a dedicated part for fastening the spacer block 35 to prevent rotate around the outer circumference of the barrel support shaft 12.

Second Embodiment

Figure 5:
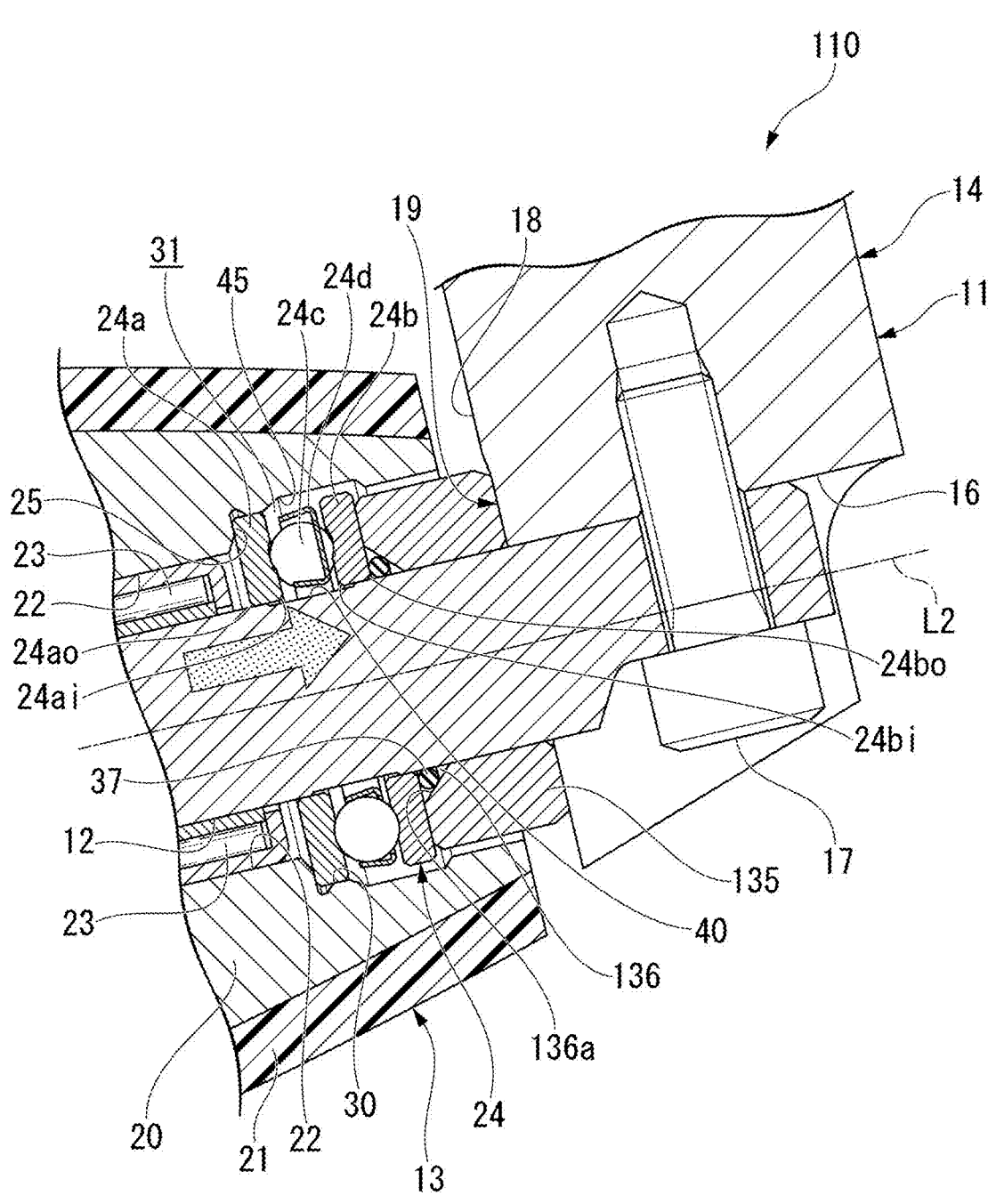
FIG. 5 is a sectional view similar to FIG. 4 of a wheel relating to the second embodiment.

FIG. 5 is a sectional view similar to FIG. 4 of the wheel 10 of the first embodiment. As shown in FIG. 5, the basic configuration of a wheel 110 in this embodiment is almost the same as that of the first embodiment. However, the configuration of the spacer block 135, which is disposed adjacent to the thrust bearing 24 and around the barrel support shaft 12, differs from the first embodiment. The spacer block 35 of the first embodiment has the annular recess 36 that has a rectangular cross section along the inner edge of the end surface facing the second race 24*b*. Whereas in the second embodiment, as shown in FIG. 5, an annular recess 136 of a spacer block 135 includes a tapered surface 136*a* whose inner diameter increases gradually toward the second race 24*b*. When the barrel 13 and barrel support shaft 12 together with the thrust bearing 24 and the spacer block 135 are assembled on the barrel holder 11, the elastic member 37 is disposed between the tapered surface 136*a* of the annular recess 136 and the outer end surface of the second race 24*b*. At the same time, the elastic member 37 elastically contacts the outer surface of the barrel support shaft 12.

The wheel 110 of this embodiment is basically configured in the same manner as the first embodiment so that the wheel 110 can obtain the same advantageous effects as the first embodiment. In the wheel 110 of this embodiment, the annular recess 136 of the spacer block 135 has the tapered surface 136*a*. Thus, when the spacer block 135 is placed in contact with the barrel support shaft 12, the barrel 13, and the barrel holder 11, together with the thrust bearing 24, the elastic member 37 can be efficiently pressed against the outer surface of the barrel support shaft 12 and the second race 24*b*. With this configuration, it is possible to more securely control the separation between the second race 24*b* and the first race 24*a* and prevent the spacer block 135 from rotating around.

The present invention is not limited to the above-described embodiments, and the embodiments can be modified in a variety of designs without deviating from the spirit of the present invention. For example, in each embodiment, an O-ring made of rubber, elastic resin, or the like is illustrated as the elastic member 37 received in the annular recess 36 (136) of the spacer block 35 (135), however the elastic member 37 is not limited to such an O-ring. For example, the elastic member 37 can have a C-shape or any other shape as long as it can provide elastic reaction force (elastic restoring force) to the second race 24*b* and the outer surface of the barrel support shaft 12. In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

The disclosure encompasses the following additional embodiments.

<1> A drive unit, including:

a wheel; and a drive device rotationally driving the wheel, wherein the wheel includes:

a barrel holder rotationally driven;

a plurality of barrel support shafts arranged on a circumference of the barrel holder at an angle to a rotation axis of the barrel holder;

barrels rotatably supported on the corresponding barrel support shafts, each of the barrels being a barrel-shaped rotating body, outer surfaces of the barrels sequentially contacting a surface on which the wheel travels as the barrel holder rotates; and bearings disposed between the respective barrel support shafts and the respective barrels, each of the bearings rotatably supporting the corresponding barrel and having a retainer, wherein the bearing is disposed at an axially outer end of the barrel and encloses the barrel support shaft, wherein a recess dented inwardly in the axial direction is provided in an axial end portion of the barrel, the bearing is housed in a bearing housing portion defined by the recess and an outer surface of the barrel support shaft, wherein a groove is provided at least in a region of an inner circumferential surface of the recess, the region extends in the axial direction and includes a radially outer projected area of the retainer.

<2> A transfer device, including:

a wheel; a drive device rotationally driving the wheel; and a vehicle body supporting the wheel and the drive device, wherein the wheel includes:

a barrel holder rotationally driven;

a plurality of barrel support shafts arranged on a circumference of the barrel holder at an angle to a rotation axis of the barrel holder;

barrels rotatably supported on the corresponding barrel support shafts, each of the barrels being a barrel-shaped rotating body, outer surfaces of the barrels contacting a surface on which the wheel travels as the barrel holder rotates; and bearings disposed between the respective barrel support shafts and the respective barrels, each of the bearings rotatably supporting the corresponding barrel and having a retainer, wherein the bearing is disposed at an axially outer end of the barrel and encloses the barrel support shaft, wherein a recess dented inwardly in the axial direction is provided in an axial end portion of the barrel, the bearing is housed in a bearing housing portion defined by the recess and an outer surface of the barrel support shaft, wherein a groove is provided at least in a region of an inner circumferential surface of the recess, the region extends in the axial direction and includes a radially outer projected area of the retainer.

What is claimed is:

1. A mecanum wheel, comprising:

a rotatable holder;

a plurality of barrel support shafts arranged on a circumference of the rotatable holder at an angle to a rotation axis of the rotatable holder;

barrels rotatably supported on each of the plurality of barrel support shafts, each of the barrels being a barrel-shaped rotating body, outer surfaces of the barrels sequentially contacting a surface on which the wheel travels as the rotatable holder rotates; and bearings disposed between the barrel support shafts and the barrels, each of the bearings rotatably supporting the corresponding barrel and having a retainer, wherein the bearing is disposed at an axially outer end of the barrel and encloses the barrel support shaft, wherein a first groove is provided at least in a region of an outer circumferential surface of the barrel support shafts, the region extends in an axial direction and includes a radially inner projected area of the retainer.

2. The mecanum wheel of claim 1, wherein the bearing includes:

a first race abutting a first member in the axial direction, the first member being disposed on an opposite side of the rotatable holder in the axial direction with the bearing therebetween;

a second race abutting a second member in the axial direction, the second member being disposed closer to the rotatable holder than the bearing in the axial direction; and a plurality of rolling elements disposed between the first race and the second race, the plurality of rolling elements rollably contacting the first race and the second race;

wherein the retainer is disposed between the first race and the second race and supports the plurality of rolling elements, wherein the first groove is provided in the outer circumferential surface of the barrel support shafts, the first groove extends in the axial direction and crosses over an end portion of an inner end surface of the first race and an end portion of an inner end surface of the second race, and wherein the inner end surface of the first race and the inner end surface of the second race oppose each other.

3. The mecanum wheel of claim 2, wherein the first groove is provided in the outer circumferential surface of the barrel support shafts such that the first groove does not cross over an end portion of an outer end surface of the first race and an end portion of an outer end surface of the second race, and wherein the outer end surface of the first race and the outer end surface of the second race face away from the rolling elements in the axial direction.

4. The mecanum wheel of claim 1, wherein a recess dented inwardly in the axial direction is provided in an axial end portion of the barrel, wherein the bearing is housed in a bearing housing portion defined by the recess and the outer circumferential surface of the barrel support shaft, and wherein a second groove is provided at least in a region of an inner circumferential surface of the recess, the region extends in the axial direction and includes a radially outer projected area of the retainer.

5. A mecanum wheel, comprising:

a rotatable holder;

a plurality of barrel support shafts arranged on a circumference of the rotatable holder at an angle to a rotation axis of the rotatable holder;

barrels rotatably supported on each of the plurality of barrel support shafts, each of the barrels being a barrel-shaped rotating body, outer surfaces of the barrels contacting a surface on which the wheel travels as the rotatable holder rotates; and bearings disposed between the barrel support shafts and the barrels, each of the bearings rotatably supporting the corresponding barrel and having a retainer, wherein the bearing is disposed at an axially outer end of the barrel and encloses the barrel support shafts, wherein a recess dented inwardly in the axial direction is provided in an axial end portion of the barrel, wherein the bearing is housed in a bearing housing portion defined by the recess and the outer circumferential surface of the barrel support shafts, and wherein a second groove is provided at least in a region of an inner circumferential surface of the recess, the region extends in the axial direction and includes a radially outer projected area of the retainer.

6. The mecanum wheel of claim 1, wherein the bearing includes:

a first race abutting a first member in the axial direction, the first member being disposed on an opposite side of the rotatable holder in the axial direction with the bearing therebetween;

a second race abutting a second member in the axial direction, the second member being disposed closer to the rotatable holder than the bearing in the axial direction;

a plurality of rolling elements disposed between the first race and the second race, the plurality of rolling elements rollably contacting the first race and the second race;

wherein the retainer is disposed between the first race and the second race and supports the plurality of rolling elements, wherein a spacer block is disposed between an outer end surface of the second race, which faces away from the rolling elements in the axial direction and the rotatable holder, the spacer block being attached on the outer circumferential surface of the barrel support shafts, and wherein an elastic member is disposed between the spacer block and the second race, the elastic member contacts the spacer block, the outer end surface of the second race, and the outer circumferential surface of the barrel support shafts.

7. A drive unit comprising:

a mecanum wheel; and a drive device rotationally driving the mecanum wheel, wherein the mecanum wheel includes:

a rotatable holder;

a plurality of barrel support shafts arranged on a circumference of the rotatable holder at an angle to a rotation axis of the rotatable holder;

barrels rotatably supported on each of the plurality of barrel support shafts, each of the barrels being a barrel-shaped rotating body, outer surfaces of the barrels contacting a surface on which the wheel travels as the rotatable holder rotates; and bearings disposed between the barrel support shafts and the barrels, each of the bearings rotatably supporting the corresponding barrel and having a retainer, wherein the bearing is disposed proximate an axially outer end of the barrel and encloses the barrel support shafts, and wherein a first groove is provided at least in a region of an outer circumferential surface of the barrel support shafts, the region extends in an axial direction and includes a radially inner projected area of the retainer.

8. A transfer device, comprising:

a mecanum wheel;

a drive device rotationally driving the mecanum wheel; and a vehicle body supporting the mecanum wheel and the drive device, wherein the mecanum wheel includes:

a rotatable holder;

a plurality of barrel support shafts arranged on a circumference of the rotatable holder at an angle to a rotation axis of the rotatable holder;

barrels rotatably supported on each of the plurality of barrel support shafts, each of the barrels being a barrel-shaped rotating body, outer surfaces of the barrels sequentially contacting a surface on which the wheel travels as the rotatable holder rotates; and bearings disposed between the barrel support shafts and the barrels, each of the bearings rotatably supporting the corresponding barrel and having a retainer, wherein the bearing is disposed at an axially outer end of the barrel and encloses the barrel support shafts, and wherein a first groove is provided at least in a region of an outer circumferential surface of the barrel support shafts, the region extends in an axial direction and includes a radially inner projected area of the retainer.

9. The mecanum wheel of claim 5, wherein the bearing includes:

a first race abutting a first member in the axial direction, the first member being disposed on an opposite side of the rotatable holder in the axial direction with the bearing therebetween;

a second race abutting a second member in the axial direction, the second member being disposed closer to the rotatable holder than the bearing in the axial direction;

a plurality of rolling elements disposed between the first race and the second race, the plurality of rolling elements rollably contacting the first race and the second race;

wherein the retainer is disposed between the first race and the second race and supports the plurality of rolling elements, wherein a spacer block is disposed between an outer end surface of the second race, which faces away from the rolling elements in the axial direction, and the rotatable holder, the spacer block being attached on the outer circumferential surface of the barrel support shafts, and wherein an elastic member is disposed between the spacer block and the second race, the elastic member contacts the spacer block, the outer end surface of the second race, and the outer circumferential surface of the barrel support shaft.

* * * * *